United States Patent
Sano et al.

(10) Patent No.: US 8,560,210 B2
(45) Date of Patent: Oct. 15, 2013

(54) CONTROL APPARATUS FOR INTERNAL COMBUSTION ENGINE

(75) Inventors: Keisuke Sano, Susono (JP); Norihisa Nakagawa, Numazu (JP); Takashi Nishikiori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/511,007

(22) PCT Filed: Jan. 20, 2010

(86) PCT No.: PCT/JP2010/050638
§ 371 (c)(1),
(2), (4) Date: May 21, 2012

(87) PCT Pub. No.: WO2011/089694
PCT Pub. Date: Jul. 28, 2011

(65) Prior Publication Data
US 2012/0290196 A1     Nov. 15, 2012

(51) Int. Cl.
*F02D 13/06* (2006.01)
*F02D 17/02* (2006.01)

(52) U.S. Cl.
USPC ........... 701/104; 701/112; 701/113; 123/481; 123/482; 123/198 F; 123/198 DB (58) Field of Classification Search
USPC ............ 123/90.15, 481, 198 DB, 198 F, 482; 701/103–105, 112–113
See application file for complete search history.

(56) References Cited

U.S. PATENT DOCUMENTS 5,337,720 A     8/1994   Murakami et al.
(Continued)

FOREIGN PATENT DOCUMENTS

JP     5 33686     2/1993
(Continued)

OTHER PUBLICATIONS

International Search Report issued on Feb. 23, 2010 in PCT/JP10/50638 filed on Jan. 20, 2010.

*Primary Examiner* — Hai Huynh
(74) *Attorney, Agent, or Firm* — Oblon, Spivak, McClelland, Maier & Neustadt, L.L.P.

(57) ABSTRACT

A control apparatus for an internal combustion engine is provided, which is capable of suppressing deterioration of exhaust emission due to an unburned fuel contained in oil which enters a combustion chamber during valve stop control while preventing inflow of fresh air to a catalyst, at a time of valve return following return from fuel cut. Variable valve operating apparatuses having valve stop mechanisms capable of changing operation states of an intake valve and an exhaust valve between valve operation states and valve closed and stopped states are included. Valve stop control that changes the operation states of the intake valve and the exhaust valve to the valve closed and stopped states is performed, at a time of execution of the fuel cut. When a return request from the fuel cut with the valve stop control is detected, a fuel is supplied to a combustion chamber before the operation state of the exhaust valve is returned to the valve operation state. The fuel supply amount in this case is corrected in accordance with an amount of the unburned fuel contained in the oil which enters into the combustion chamber from a crank chamber side during the fuel cut with the valve stop control.

5 Claims, 3 Drawing Sheets

(56) References Cited

U.S. PATENT DOCUMENTS

| | | | |
|---|---|---|---|
| 6,738,706 B2 * | 5/2004 | Cullen et al. | 701/103 |
| 7,607,410 B2 * | 10/2009 | Magner et al. | 123/90.15 |
| 2009/0048763 A1 | 2/2009 | Nishikiori et al. | |

FOREIGN PATENT DOCUMENTS

| | | |
|---|---|---|
| JP | 2000 034941 | 2/2000 |
| JP | 2001 164928 | 6/2001 |
| JP | 2004 027995 | 1/2004 |
| JP | 2004 232577 | 8/2004 |
| JP | 2006 250023 | 9/2006 |
| JP | 2007 211720 | 8/2007 |
| JP | 2007 285239 | 11/2007 |

* cited by examiner

CONTROL APPARATUS FOR INTERNAL COMBUSTION ENGINE

TECHNICAL FIELD

The present invention relates to a control apparatus for an internal combustion engine, and particularly to a control apparatus for an internal combustion engine which includes a valve stop mechanism capable of keeping at least an intake valve of the intake valve and an exhaust valve in a valve closed and stopped state.

BACKGROUND ART

Conventionally, for example, Patent Document 1 discloses a control apparatus for a cylinder cut-off type engine which can switch an operation between a full cylinder operation in which all cylinders are operated, and a cylinder cut-off operation in which drive of intake and exhaust valves of some of the cylinders is stopped to halt the some of the cylinders. In the conventional control apparatus, how many times the engine revolves during a cylinder cut-off operation is counted, and when the number of the counted revolutions reaches a predetermined value, the operation is temporarily returned to the full cylinder operation. In the above described conventional control apparatus, deterioration of exhaust emission at the time of return to the full cylinder operation due to oil ascent in the halted cylinders is prevented by the control like this.

The applicant recognizes the documents described as follows including the above described document, as the documents relating to the present invention.

CITATION LIST

Patent Documents

Patent Document 1: Japanese Laid-open Patent Application Publication No. 2000-34941
Patent Document 2: Japanese Laid-open Patent Application Publication No. Hei 05-33686
Patent Document 3: Japanese Laid-open Patent Application Publication No. 2004-232577

SUMMARY OF INVENTION

Technical Problem

In the above described conventional art, at the time of temporary return to the full cylinder operation, fuel supply to the inoperative cylinders is restarted after restart of drive of the intake and exhaust valves in the halted cylinders is completed. In the method like this, in the process from the restart of drive of the intake and exhaust valves in the halted cylinders to the restart of fuel supply to the halted cylinders, fresh air passes through the inside of the cylinders, and flows into a catalyst provided in an exhaust passage. As a result, when the catalyst is at a high temperature, occurrence of deterioration of the catalyst is a concern.

The invention is made to solve the problem as described above, and has an object to provide a control apparatus for an internal combustion engine which can suppress deterioration of exhaust emission due to an unburned fuel contained in oil which enters a combustion chamber during valve stop control while preventing an inflow of fresh air to a catalyst.

Solution to Problem

A first aspect of the present invention is a control apparatus for an internal combustion engine, the control apparatus comprising:

a valve stop mechanism that is capable of changing an operation state of at least an intake valve of the intake valve and an exhaust valve between a valve operation state and a valve closed and stopped state;

fuel cut executing means that executes fuel cut when a predetermined execution condition is established during operation of the internal combustion engine;

valve stop executing means that performs valve stop control that changes the operation state of at least the intake valve of the intake valve and the exhaust valve to the valve closed and stopped state, at a time of execution of the fuel cut;

fuel cut return request detecting means that detects a return request from the fuel cut;

advance fuel supply means that supplies a fuel to a combustion chamber of the internal combustion engine, before an operation state of the exhaust valve is returned to the valve operation state when the valve stop control is executed for both of the intake valve and the exhaust valve, or before the operation state of the intake valve is returned to the valve operation state when the valve stop control is executed for only the intake valve, if a return request from the fuel cut with the valve stop control is detected; and fuel supply amount correcting means that corrects the fuel supply amount by the advance fuel supply means in accordance with an amount of an unburned fuel contained in oil which enters an inside of the combustion chamber from a crank chamber side during the fuel cut with the valve stop control.

A second aspect of the present invention is the control apparatus for an internal combustion engine according to the first aspect of the present invention, wherein the fuel supply amount correcting means includes estimating means that estimates the unburned fuel amount, based on an integrated engine speed during the fuel cut with the valve stop control.

A third aspect of the present invention is the control apparatus for an internal combustion engine according to the first or second aspect of the present invention, wherein the valve stop executing means performs the valve stop control that changes the operation states of both of the intake valve and the exhaust valve to the valve closed and stopped states at a time of execution of the fuel cut, wherein the control apparatus further comprises intake valve advance return executing means that changes the operation state of the intake valve to the valve operation state prior to return of the exhaust valve to the valve operation state, when a return request from the fuel cut is detected, wherein the fuel supply amount correcting means includes negative pressure estimating means that estimates intake manifold negative pressure at a time of return of the intake valve to the valve operation state in accordance with the intake manifold negative pressure immediately before start of execution of the fuel cut and an executing time of the fuel cut, and wherein the fuel supply amount correcting means corrects the fuel supply amount supplied by the advance fuel supply means, based on the intake manifold negative pressure estimated by the negative pressure estimating means.

A fourth aspect of the present invention is the control apparatus for an internal combustion engine according to any one of the first to third aspects of the present invention, wherein the valve stop executing means performs the valve stop control that changes the operation states of both of the intake valve and the exhaust valve to the valve closed and stopped states at a time of execution of the fuel cut, wherein the control apparatus for the internal combustion engine further comprises filled state determining means that determines whether the inside of the combustion chamber is in a exhaust gas filled state in which exhaust gas is filled in the combustion chamber, or in a fresh air filled state in which fresh air is filled in the combustion chamber on a cylinder-by-cylinder basis, when the operation states of the intake valve and the exhaust valve are changed to the valve closed and stopped states by the valve stop executing means, and wherein the advance fuel supply means supplies a fuel to the combustion chamber before the operation state of the exhaust valve is returned to the valve operation state, for only a cylinder which is determined as being in the fresh air filled state.

A fifth aspect of the present invention is the control apparatus for an internal combustion engine according to any one of the first to fourth aspects of the present invention, further comprising catalyst temperature acquiring means that acquires a temperature of a catalyst which is disposed in an exhaust passage of the internal combustion engine, wherein the advance fuel supply means corrects the fuel supply amount so that an air-fuel ratio at a time of combustion with a fuel in the fuel supply amount becomes rich as compared with a case in which the temperature of the catalyst is a predetermined value or lower, when the temperature of the catalyst at the time of supply of the fuel in the fuel supply amount is higher than the predetermined value.

Advantageous Effects of Invention

According to the first aspect of the present invention, the unburned fuel which accumulates in the combustion chamber during fuel cut with valve stop control can be combusted together with the fuel which is supplied by the advance fuel supply means before valve return is performed following a return request from the fuel cut. Further, the fuel supply amount by the advance fuel supply means is corrected in accordance with the amount of the unburned fuel contained in the oil which enters the combustion chamber. Therefore, according to the present invention, deterioration of exhaust emission at the time of valve return due to oil loss can be suppressed while fresh air is prevented from flowing into the catalyst, at the time of valve return following return from the fuel cut.

According to the second aspect of the present invention, a proper fuel injection amount with consideration given to the amount of the unburned fuel contained in the oil which enters the combustion chamber can be obtained, and therefore, combustion at the time of valve return can be stabilized. Further, correction of the fuel injection amount with consideration given to the above described unburned fuel amount is decrease correction, and therefore, reduction of the exhaust emission and reduction of the fuel injection amount at the time of valve return can be made compatible.

According to the third aspect of the present invention, after the air amount which is taken into the combustion chamber is grasped based on the intake manifold negative pressure at the time of return of the intake valve, the above described fuel supply amount can be corrected, and therefore, combustion at the time of valve return can be stabilized. Further, reduction of the exhaust emission and reduction of the fuel injection amount at the time of valve return can be made compatible.

According to the fourth aspect of the present invention, reduction of exhaust emission at the time of valve return can be achieved without causing a misfire cylinder.

According to the fifth aspect of the present invention, control can be realized which places priority on suppression of deterioration of the catalyst when the temperature of the catalyst is high, and places priority on reduction in exhaust emission when the temperature of the catalyst is low.

DESCRIPTION OF SYMBOLS 10 internal combustion engine
14 combustion chamber
16 crank chamber
18 intake passage
20 exhaust passage
26 in-cylinder fuel injection valve
28 ignition plug
30 intake valve
32 exhaust valve
34 intake variable valve operating apparatus
36 exhaust variable valve operating apparatus
38 catalyst
40 Electronic Control Unit (ECU)
42 crank angle sensor
44 intake pressure sensor

DESCRIPTION OF EMBODIMENT

Embodiment 1

[Explanation of System Configuration]

Figure 1:
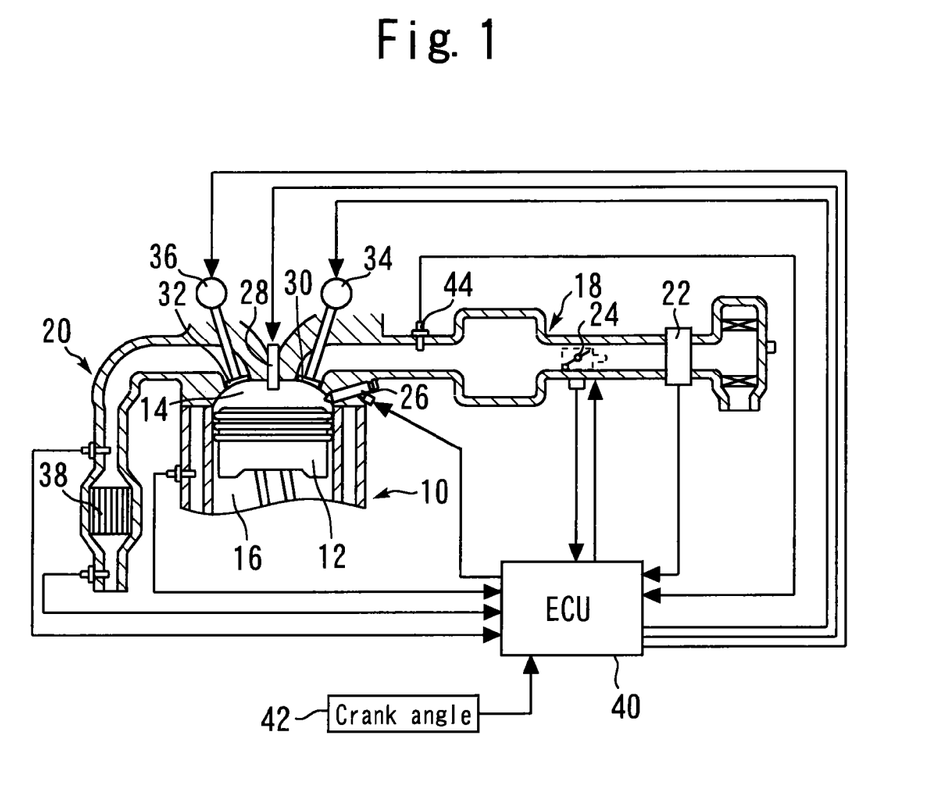
FIG. 1 is a diagram for explaining a configuration of an internal combustion engine according to embodiment 1 of the present invention.

FIG. 1 is a diagram for explaining a configuration of an internal combustion engine 10 according to embodiment 1 of the present invention. A system of the present embodiment includes a spark ignition type internal combustion engine (gasoline engine) 10. In the present embodiment, it is assumed that the internal combustion engine 10 is an in-line 4-cylinder type engine having four cylinders #1 to #4 as an example.

A piston 12 is provided in the cylinder of the internal combustion engine 10. In the cylinder of the internal combustion engine 10, a combustion chamber 14 is formed atop the piston 12, and a crank chamber 16 is formed beneath the piston 12. An intake passage 18 and an exhaust passage 20 communicate with the combustion chamber 14.

An air flow meter 22 which outputs a signal corresponding to a flow rate of air which is taken into the intake passage 18 is provided in the vicinity of an inlet of the intake passage 18. A throttle valve 24 is provided downstream of the air flow meter 22. The throttle valve 24 is an electronically controlled throttle valve which can control a throttle opening independently from an accelerator opening.

An in-cylinder fuel injection valve 26 for directly injecting a fuel into the combustion chamber 14 (into the cylinder) is provided in a cylinder head which the internal combustion engine 10 includes. Further, an ignition plug 28 is mounted to the cylinder head which the internal combustion engine 10 includes so as to protrude into the combustion chamber 14 from the top portion of the combustion chamber 14. An intake port and an exhaust port are respectively provided with an intake valve 30 and an exhaust valve 32 for bringing the combustion chamber 14 and the intake passage 18, or the combustion chamber 14 and the exhaust passage 20 into a continuing state or a cutoff state.

The intake valve 30 and the exhaust valve 32 are respectively driven by an intake variable valve operating apparatus 34 and an exhaust variable valve operating apparatus 36. The intake variable valve operating apparatus 34 has a valve stop mechanism which can change the operation state of the intake valve 30 between a valve operation state and a valve closed and stopped state for each cylinder, and likewise, the exhaust variable valve operating apparatus 36 has a valve stop mechanism which can change the operation state of the exhaust valve 32 between a valve operation state and a valve closed and stopped state. Hereinafter, in the present description, control which switches the operation states of the intake valve 30 and the exhaust valve 32 to the valve closed and stopped states from the valve operation states will be described as "valve stop control."

A specific configuration which realizes the above described valve stop mechanism is not especially limited, and the valve stop mechanism may be realized by using an electromagnetic drive valve, or may be realized by a configuration capable of halting a rocking operation of a rocker arm which transmits an operation force of a cam to the valve by using a switch pin, for example. Further, in the exhaust passage 20, a catalyst 38 for purifying exhaust gas is disposed.

The system shown in FIG. 1 includes an ECU (Electronic Control Unit) 40. Various sensors for detecting an operation state of the internal combustion engine 10 such as a crank angle sensor 42 for detecting an engine speed, and an intake pressure sensor 44 for detecting intake pressure (intake manifold pressure) are connected to input of the ECU 40, in addition to the above described air flow meter 22. Further, the aforementioned various actuators are connected to output of the ECU 40. The ECU 40 can control the operation state of the internal combustion engine 10 based on these sensor outputs.

[Control of Embodiment 1 in Fuel Cut Execution Time]

When fresh air with a high oxygen concentration is supplied to the catalyst 38 in a state in which the catalyst 38 disposed in the exhaust passage 20 is in a high-temperature state, occurrence of deterioration of the catalyst 38 is a concern. According to the system of the present embodiment including the above described variable valve operating apparatuses 34 and 36, when a fuel cut execution request is issued at the time of deceleration or the like, the respective operation states of the intake valve 30 and the exhaust valve 32 can be brought into the valve closed and stopped states, and thereby, fresh air can be prevented from flowing into the catalyst 38 during the fuel cut.

When the intake valve 30 and the exhaust valve 32 are brought into the valve closed and stopped states during execution of the fuel cut, the inside of the combustion chamber 14 is brought into a negative pressure state. As a result, the phenomenon occurs, in which oil adhering to a cylinder wall surface is pushed up (enters) to the combustion chamber 14 side from the crank chamber 16 side (so-called oil loss). The oil adhering to the cylinder wall surface especially contains an unburned fuel (HC) which adheres to the cylinder wall surface at the time of cold starting. The unburned fuel contained in the oil which is pushed up to the combustion chamber 14 side during valve stop control is discharged to the exhaust passage 20 at the time of return to a valve operation state from the valve closed and stopped state (hereinafter, simply referred to as "time of valve return" in some cases). As a result, exhaust emission is deteriorated.

Thus, in the present embodiment, control as follows is performed in order to suppress deterioration of exhaust emission by the unburned fuel contained in the oil which enters the combustion chamber 14 during valve stop control while preventing inflow of fresh air into the catalyst 38, at the time of valve return that follows return from the fuel cut.

More specifically, when a request for return from the fuel cut with valve stop control is detected, a fuel is supplied to the combustion chamber 14 before the operation state of the exhaust valve 32 is returned to a valve operation state. More specifically, at the time of detection of the return request, the intake valve 30 is opened first to introduce fresh air into the combustion chamber 14, and a fuel in a minimum injection amount which is combustible (minimum combustible injection amount) is injected into the combustion chamber 14. Subsequently, after combustion with the minimum combustible fuel amount, the exhaust valve 32 is returned. Further, in the present embodiment, the above described minimum combustible injection amount is corrected in accordance with the amount of an unburned fuel (hereinafter, referred to as "in-cylinder HC amount" in some cases) contained in oil which enters the combustion chamber 14 side from the crank chamber 16 side during the fuel cut with valve stop control of the intake and exhaust valves 30 and 32.

Further, in the present embodiment, the in-cylinder HC amount contained in the oil which enters the combustion chamber 14 is estimated based on an integrated engine speed during the fuel cut with the valve stop control. Further, in the present embodiment, after the intake manifold negative pressure at the time of return of the intake valve is estimated in accordance with the intake manifold negative pressure directly before start of execution of the fuel cut and an executing time of the fuel cut, the above described minimum combustible injection amount is corrected based on the estimated intake manifold negative pressure at the time of return of the intake valve.

Further, in the present embodiment, it is determined whether each cylinder in which the intake and exhaust valves 30 and 32 are brought into the valve closed and stopped states in response to implementation of the fuel cut is in an exhaust gas filled state in which exhaust gas is filled in the combustion chamber 14, or a fresh air filled state in which fresh air is filled in the combustion chamber 14, for each cylinder. Subsequently, for only the cylinder which is determined as being in the fresh air filled state, combustion by the fuel in the above described minimum combustible injection amount is executed before the operation state of the exhaust valve 32 is returned to the valve operation state.

Further, in the present embodiment, when the temperature of the catalyst 38 at the time of returning the operation state of the exhaust valve 32 to the valve operation state (at the time of supply of the fuel in the above described minimum combustible injection amount) is higher than a predetermined value A, the above described minimum combustible injection amount is further corrected so that an air-fuel ratio at the time of combustion of and after the initial explosion with the fuel in the above described minimum combustible injection amount becomes rich as compared with the case in which the temperature of the catalyst 38 is the predetermined value A or lower.

Figure 2:
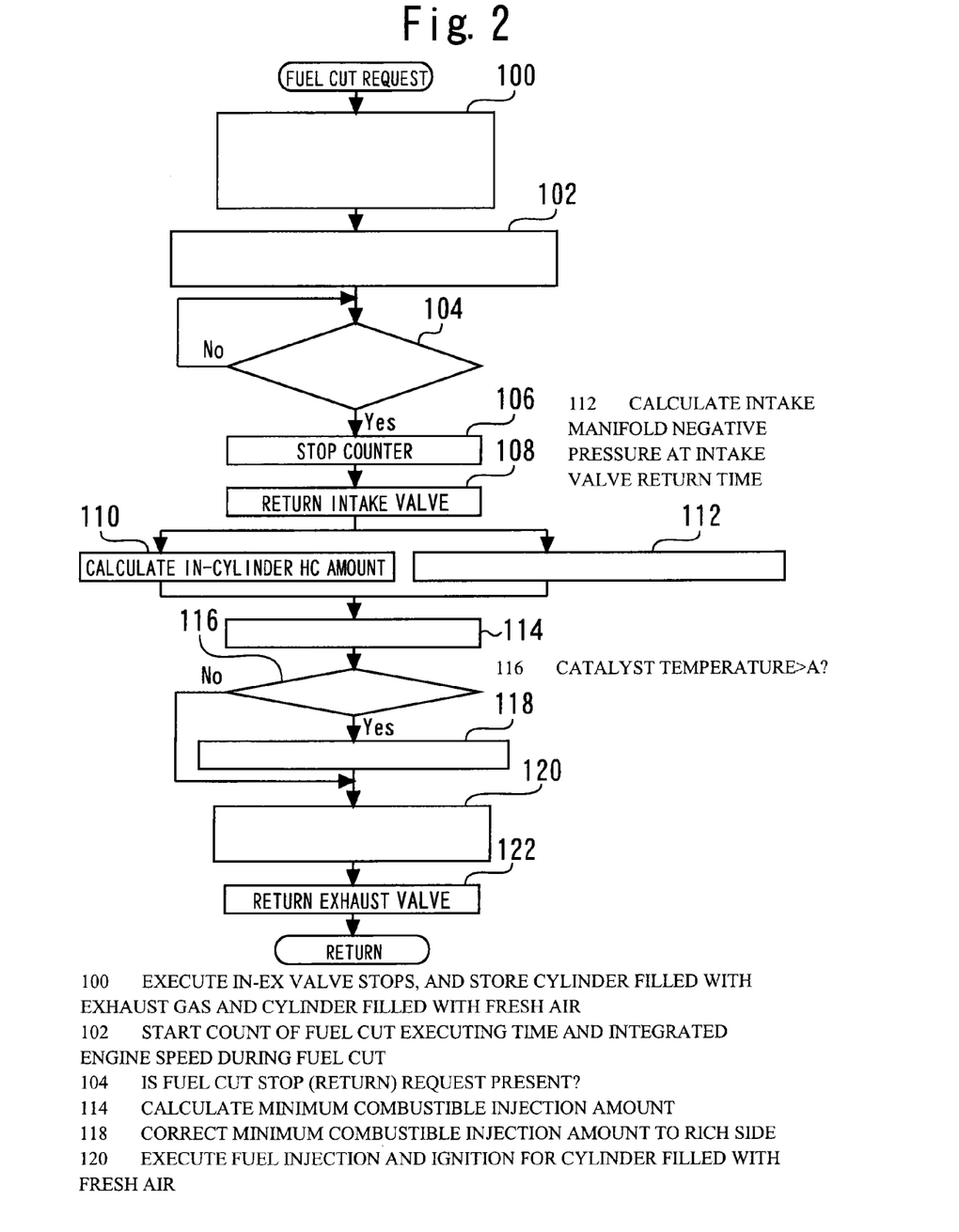
FIG. 2 is a flowchart of a control routine that is executed in embodiment 1 of the present invention.

FIG. 2 is a flowchart showing a control routine which the ECU 40 executes in order to realize the above described function. The routine shown in FIG. 2 is started when an execution request of fuel cut is detected.

In the routine shown in FIG. 2, valve stop control that changes the operation states of the intake valves 30 and the exhaust valves 32 in all the cylinders to the valve closed and stopped states respectively is executed first (step 100). Further, in present step 100, it is determined for each cylinder whether each cylinder in which the intake and exhaust valves 30 and 32 are brought into the valve closed and stopped states is in an exhaust gas filled state in which exhaust gas is filled in the combustion chamber 14, or in the fresh air filled state in which fresh air is filled in the combustion chamber 14, and the determination result is stored. The above described valve stop control is started in all the cylinders immediately after an execution request of fuel cut is received. Therefore, timing in which the intake and exhaust valves 30 and 32 are brought into the valve closed and stopped state differs according to the cylinder, and as a result, the cylinders which are in the above described fresh air filled state and the cylinders which are in the above described exhaust gas filled state can exist. In present step 100, it is determined whether each cylinder is a fresh air filled cylinder or an exhaust gas filled cylinder by using the crank angle sensor 42. For example, the cylinder which is brought into the valve closed and stopped state at the time of end of the intake stroke is determined as being in a fresh air filled state, and the cylinder which is brought into the valve closed and stopped state at the time of end of the expansion stroke is determined as being in an exhaust gas filled state.

Next, by a counter which counts the executing time of the fuel cut with the above described valve stop control, and a counter which counts the integrated engine speed during the fuel cut, count of the executing time of the fuel cut of this time and count of the integrated engine speed during the fuel cut are started respectively (step 102). Next, it is determined whether or not a stop request of fuel cut (a return request from the fuel cut) is present (step 104).

When it is determined that the return request from the fuel cut is present as a result, the count of the executing time of the fuel cut of this time and the count of the integrated engine speed during the fuel cut by the above described counters are respectively stopped (step 106). Next, prior to return of the exhaust valve 32 of each cylinder, processing of returning the operation state of the intake valve 30 of each cylinder to the valve operation state is executed (step 108).

Figure 3:
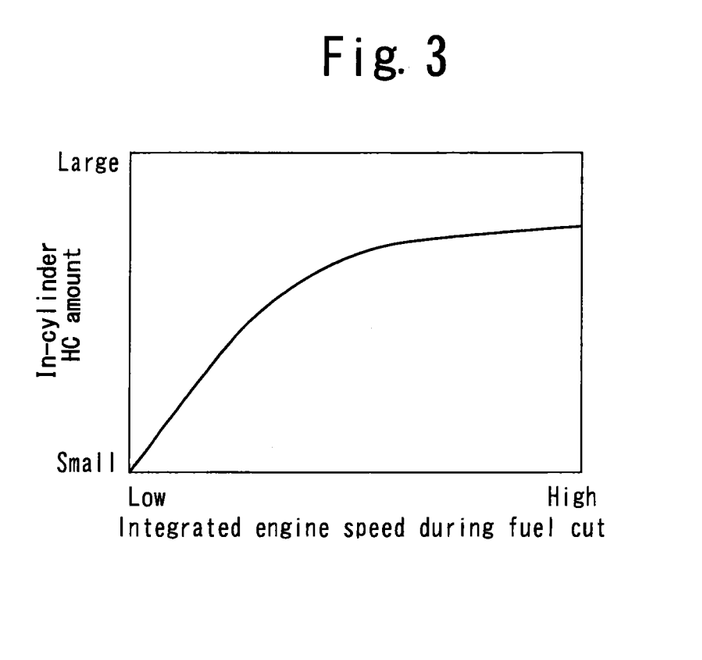
FIG. 3 is a diagram expressing a relation of an in-cylinder HC amount and an integrated engine speed during a fuel cut.

Next, based on the integrated engine speed during the fuel cut which is counted by the above described counter, the in-cylinder HC amount contained in the oil which is pushed up into the combustion chamber 14 during execution of the valve stop control is calculated (step 110). FIG. 3 is a diagram expressing a relation of the in-cylinder HC amount and the integrated engine speed during the fuel cut. The amount of the oil (oil loss amount) which is pushed up into the combustion chamber 14 during execution of the fuel cut with valve stop control increases because as the integrated engine speed during the fuel cut becomes higher, the period of time in which the inside of the combustion chamber 14 is placed under negative pressure becomes longer. With this, the in-cylinder HC amount contained in the oil which is pushed up into the combustion chamber 14 also increases in accordance with the integrated engine speed during the fuel cut as shown in FIG. 3. The ECU 40 stores the relation as a map as shown in FIG. 3, and in present step 110, the in-cylinder HC amount is calculated based on the integrated engine speed during the fuel cut, with reference to such a map.

Figure 4:
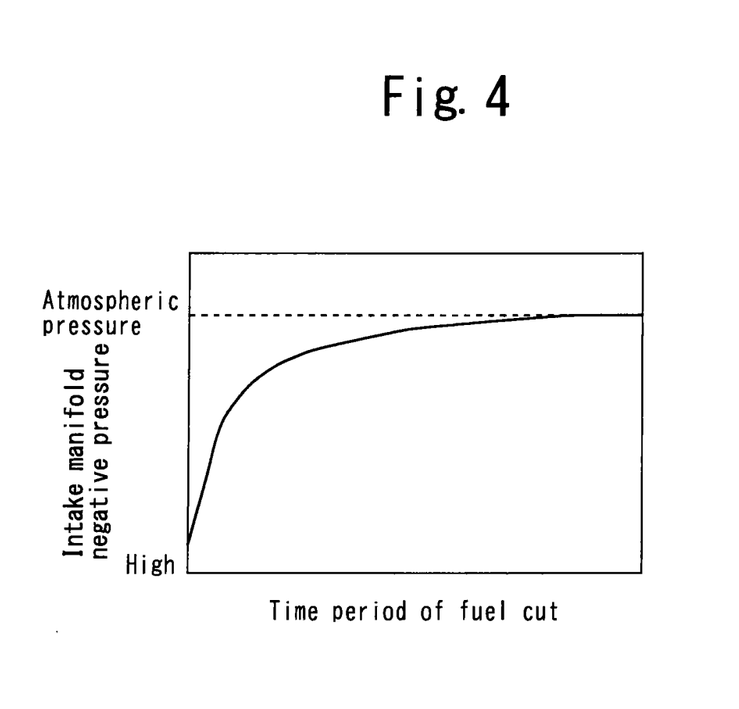
FIG. 4 is a diagram showing a relation of an intake manifold negative pressure and executing time of the fuel cut.

In the routine shown in FIG. 2, in parallel with calculation of the in-cylinder HC amount in above described step 110, the intake manifold negative pressure at the time of return of the intake valve 30 in above described step 108 is calculated, based on the intake manifold negative pressure immediately before start of execution of the fuel cut and the executing time of the fuel cut which is counted by the above described counter (step 112). FIG. 4 is a diagram showing a relation of the intake manifold negative pressure and the executing time of the fuel cut. As shown in FIG. 4, as the executing time of the fuel cut with the valve stop control becomes longer, the intake manifold negative pressure becomes closer to atmospheric pressure. In consideration of such a tendency, the ECU 40 stores a map (not illustrated) which defines the intake manifold negative pressure at the time of return of the intake valve 30, in relation of the intake manifold negative pressure immediately before start of execution of the fuel cut and the executing time of the fuel cut. In present step 112, the intake manifold negative pressure at the time of return to the intake valve is calculated with reference to the map like this (step 112).

Next, the minimum injection amount which is combustible (hereinafter, described as "minimum combustible injection amount") in the state in which fresh air is introduced with return of the intake valve 30 of each cylinder in above described step 108 is calculated (step 114). In present step 114, the above described minimum combustible injection amount is calculated so that the air-fuel ratio of the gas which is combusted under the situation in which the above described in-cylinder HC amount accumulates in the combustion chamber 14 during execution of the fuel cut becomes a theoretical air-fuel ratio (or a fuel-air ratio leaner than the theoretical air-fuel ratio), based on the in-cylinder HC amount and the intake manifold negative pressure at the time of return of the intake valve, which are calculated in above described steps 110 and 112. More specifically, the above described minimum combustible injection amount is calculated as the value which is reduced more significantly, as the above described in-cylinder HC amount which accumulates in the combustion chamber 14 during execution of the fuel cut is larger.

Further, when the intake manifold negative pressure at the time of return of the intake valve changes, the amount of air which is taken into the combustion chamber 14 changes. Therefore, in present step 114, the above described minimum combustible injection amount is corrected based on the intake manifold negative pressure at the time of return of the intake valve which is calculated in above described step 112. More specifically, in present step 114, the amount of air which is taken into the combustion chamber 14 at the time of return of the intake valve is estimated based on the intake manifold negative pressure at the time of return of the intake valve, and thereafter, the above described minimum combustible injection amount is corrected so that the air-fuel ratio at the time of combustion when air in the estimated amount is taken into the combustion chamber 14 becomes the theoretical air-fuel ratio (or an air-fuel ratio leaner than the theoretical air-fuel ratio). The estimated value of the amount of air which is taken into the combustion chamber 14 at the time of return of the intake valve can be calculated with reference to a map (not illustrated) which defines the estimated value in the relation with the intake manifold negative pressure and the like at the time of return of the intake valve, for example.

Next, it is determined whether or not the temperature of the catalyst 38 is higher than the above described predetermined value A (step 116). The predetermined value A in present step 116 is the value which is set in advance as the threshold value for determining whether it is a situation in which deterioration of the catalyst 38 by inflow of fresh air to the catalyst 38 is a concern. The temperature of the catalyst 38 can be estimated based on the operation record of the internal combustion engine 10, for example, or may be acquired by a temperature sensor.

When the temperature of the catalyst 38 is determined as the above described predetermined value A or lower in above described step 116, that is, when the situation can be determined as the situation in which deterioration of the catalyst 38 is not a concern, further correction of the above described minimum combustible injection amount is not executed. Meanwhile, when the temperature of the catalyst 38 is determined as being higher than the above described predetermined value A in above described step 116, that is, when the situation can be judged as the situation in which deterioration of the catalyst 38 is a concern, further correction of the above described minimum combustible injection amount is executed so that the air-fuel ratio at the time of combustion after initial explosion at the time of valve return with the above described minimum combustible injection amount becomes rich as compared with the case in which the temperature of the catalyst 38 is the above described predetermined value A or lower (that is, the case in which the above described minimum combustible injection amount is calculated so that the theoretical air-fuel ratio can be obtained) (step 118).

Next, in above described step 100, fuel injection using the minimum combustible injection amount which is calculated as described above and ignition are executed in only the cylinder which is determined as being in the fresh air filled state (step 120). In regard with the cylinder which is determined as being in the exhaust gas filled state, fuel injection and ignition in present step 120 are not executed.

Further, in the routine shown in FIG. 2, after combustion using the above described minimum combustible injection amount is executed in above described step 120, processing of returning the operation state of the exhaust valve 32 of each cylinder to the valve operation state is executed (step 122).

According to the routine shown in FIG. 2 described above, when a return request from the fuel cut with valve stop control is detected, the intake valve 30 is opened first, whereby fresh air is introduced into the combustion chamber 14, and the fuel in the above described minimum combustible injection amount is injected into the combustion chamber 14. Thereafter, after combustion with the minimum combustible injection amount, the processing of returning the exhaust valve 32 is executed. Further, the above described minimum combustible injection amount is corrected in accordance with the in-cylinder HC amount contained in the oil which enters the combustion chamber 14 from the crank chamber 16 side during the fuel cut with valve stop control of the intake and exhaust valves 30 and 32. Thereby, after the cylinder HC which accumulates in the combustion chamber 14 during the fuel cut is combusted with the fuel in the above described minimum combustible injection amount, and thereafter, valve return of the intake and exhaust valves 30 and 32 can be completed. By the procedures as above, combustion before valve return and completion of valve return are executed, whereby at the time of valve return that follows return from the fuel cut, deterioration of exhaust emission at the time of valve return due to oil loss can be suppressed while fresh air is prevented from flowing into the catalyst 38.

Further, according to the above described routine, based on the integrated engine speed during fuel cut with valve stop control, the in-cylinder HC amount contained in the oil which enters the combustion chamber 14 is estimated. Thereby, a suitable fuel injection amount with the above described in-cylinder HC amount taken into consideration can be obtained, and therefore, combustion at the time of valve return can be stabilized. Further, correction of the fuel injection amount with the in-cylinder HC amount taken into consideration is decrease correction, and therefore, reduction in the exhaust emission at the time of valve return and reduction in fuel injection amount can be made compatible.

Further, according to the above described routine, the intake manifold negative pressure at the time of return of the intake valve is estimated in accordance with the intake manifold negative pressure immediately before start of execution of the fuel cut and the executing time of the fuel cut, and thereafter, the above described minimum combustible injection amount is corrected based on the estimated intake manifold negative pressure. Thereby, the amount of the air which is taken into the combustion chamber 14 at the time of return of the intake valve is grasped, and combustion at the time of valve return can be stabilized. Further, reduction of the exhaust emission and reduction of the fuel injection amount at the time of valve return can be made compatible.

Further, according to the above described routine, combustion with the fuel in the above described minimum combustible injection amount is executed before the exhaust valve 32 is returned, for only the cylinder which is determined as being in the fresh air filled state. For the cylinder which is determined as being not in the fresh air filled state, the above described combustion is not executed, and thereby, exhaust emission at the time of valve return can be reduced without causing a misfire cylinder.

Further, according to the above described routine, when the temperature of the catalyst 38 at the time of returning the exhaust valve 32 is higher than the above described predetermined value A, the above described minimum combustible injection amount is further corrected so that the air-fuel ratio at the time of combustion of and after the initial explosion with the fuel in the above described minimum combustible amount becomes rich as compared with the case in which the temperature of the catalyst 38 is the predetermined value A or less. Thereby, control which places priority on suppression of deterioration of the catalyst 38 when the temperature of the catalyst 38 is high, and places priority on reduction of the exhaust emission when the temperature of the catalyst 38 is low can be realized.

Incidentally, in embodiment 1 described above, when the request for return from the fuel cut with valve stop control is detected, the intake valve 30 is first opened whereby fresh air is introduced into the combustion chamber 14, and after combustion is performed by injecting the fuel in the minimum injection amount which is combustible by the in-cylinder fuel injection valve 26, the exhaust valve 32 is returned. According to the method like this, the intake valve 30 is opened in advance and fresh air is introduced, whereby stability of the above described combustion before return of the exhaust valve 32 can be ensured favorably. However, in the present invention, the method which supplies the fuel to the combustion chamber before returning the operation state of the exhaust valve to the valve operation state when a return request from the fuel cut with valve stop control is detected is not limited to this. More specifically, for example, when the above described return request is detected, the minimum injection amount which brings the area in the vicinity of the ignition plug 28 into a combustible atmosphere may be injected by the in-cylinder fuel injection valve 26 before the exhaust valve 32 is opened. Subsequently, after stratified charge combustion is performed under a lean air-fuel ratio in the vicinity of the ignition plug 28 by the minimum injection amount like this, the intake valve 30 and the exhaust valve 32 may be returned to the valve operation state.

Further, in embodiment 1 described above, based on the integrated engine speed during the fuel cut with valve stop control, the in-cylinder HC amount contained in the oil which enters the combustion chamber 14 is estimated. However, the present invention is not limited to this, and for example, based on the executing time of the fuel cut with valve stop control, the unburned fuel amount contained in the oil which enters the combustion chamber 14 may be estimated.

Further, in embodiment 1 described above, when an execution request of fuel cut is detected, the valve stop control is executed for both of the intake valve 30 and the exhaust valve 32, but the present invention is not limited to this. More specifically, when the valve stop control is executed for only the intake valve 30, the state is brought, in which gas comes and goes between the combustion chamber 14 and the exhaust manifold, and return of the intake valve 30 is performed from the state, whereby flow of the gas from the intake side to the exhaust side via the combustion chamber 14 is restarted. Further, when valve stop control is executed for only the intake valve 30 as above, the inside of the combustion chamber 14 is also brought into the negative pressure state in the intake stroke and the expansion stroke, and the unburned fuel contained in the oil enters the combustion chamber 14 side from the crank chamber 16 side. Accordingly, the control of the present invention may be applied to the configuration which executes valve stop control by changing only the operation state of the intake valve to the valve closed and stopped state when an execution request of fuel cut is detected.

Further, in embodiment 1 described above, the fuel cut time with valve stop control with all the cylinders as a target is described as an example. However, the present invention is not limited to this, and is also applicable to the time of some-of-cylinders cut-off operation with valve stop control for some of the cylinders.

Further, in embodiment 1 described above, the spark ignition type internal combustion engine (gasoline engine) 10 is described as an example. However, the internal combustion engine to be the target of the present invention is not limited to this, and may be, for example, a compression ignition type internal combustion engine such as a diesel engine.

Further, in embodiment 1 described above, by using the in-cylinder fuel injection valve 26 which directly injects a fuel into the combustion chamber 14, the fuel is supplied to the combustion chamber 14, before the operation state of the exhaust valve 32 is returned to the valve operation state when a return request from the fuel cut with valve stop control is detected. However, in the case of using the method which opens the intake valve 30 in advance before opening of the exhaust valve 32 to introduce fresh air, as the method which is specifically described in embodiment 1 described above, the fuel injection valve in the present invention is not limited to the one that directly injects a fuel into the combustion chamber 14. That is, the fuel injection valve (not illustrated) is included in the intake port, and the fuel which is injected in the intake port by using the fuel injection valve may be supplied into the combustion chamber 14.

In embodiment 1 described above, the valve stop mechanisms included by the intake variable valve operating apparatus 34 and the exhaust variable valve operating apparatus 36 correspond to the "valve stop mechanism" in the aforesaid first aspect of the present invention. The ECU 40 stops fuel injection by the in-cylinder fuel injection valve 26 when the predetermined execution condition is established, whereby "fuel cut executing means" is realized, the ECU 40 executes the processing of above described step 100, whereby "valve stop executing means" in the aforesaid first aspect of the present invention is realized, the ECU 40 executes the processing of above described step 104, whereby "fuel cut return request detecting means" in the aforesaid first aspect of the present invention is realized, the ECU 40 executes the processing of above described step 120, whereby "advance fuel supply means" in the aforesaid first aspect of the present invention is realized, and the ECU 40 executes the processing of above described steps 110 to 118, whereby "fuel supply amount correcting means" in the aforesaid first aspect of the present invention is realized, respectively.

Further, the ECU 40 executes the processing of above described step 108, whereby "intake valve advance return executing means" in the aforesaid third aspect of the present invention is realized, and the ECU 40 executes the processing of above described step 112, whereby "negative pressure estimating means" in the aforesaid third aspect of the present invention is realized, respectively.

Further, the ECU 40 executes the processing of above described step 100, whereby "filled state determining means" in the aforesaid fourth aspect of the present invention is realized.

Further, the ECU 40 executes the processing of above described step 116, whereby "catalyst temperature acquiring means" in the aforesaid fifth aspect of the present invention is realized.

The invention claimed is:

1. A control apparatus for an internal combustion engine, the control apparatus comprising:
    a valve stop mechanism that is capable of changing operation states of an intake valve and an exhaust valve between valve operation states and valve closed and stopped states, respectively;
    fuel cut executing means that executes fuel cut when a predetermined execution condition is established during operation of the internal combustion engine;
    valve stop executing means that performs valve stop control that changes the operation states of both of the intake valve and the exhaust valve to the valve closed and stopped states, at a time of execution of the fuel cut;
    fuel cut return request detecting means that detects a return request from the fuel cut;
    advance fuel supply means that supplies a fuel to a combustion chamber of the internal combustion engine, before an operation state of the exhaust valve is returned to the valve operation state, if a return request from the fuel cut with the valve stop control is detected;
    fuel supply amount correcting means that corrects the fuel supply amount by the advance fuel supply means in accordance with an amount of an unburned fuel contained in oil which enters an inside of the combustion chamber from a crank chamber side during the fuel cut with the valve stop control; and
    intake valve advance return executing means that changes the operation state of the intake valve to the valve operation state prior to return of the exhaust valve to the valve operation state, when a return request from the fuel cut is detected,
    wherein the fuel supply amount correcting means includes negative pressure estimating means that estimates intake manifold negative pressure at a time of return of the intake valve to the valve operation state in accordance with the intake manifold negative pressure immediately before start of execution of the fuel cut and an executing time of the fuel cut, and
    wherein the fuel supply amount correcting means corrects the fuel supply amount supplied by the advance fuel supply means, based on the intake manifold negative pressure estimated by the negative pressure estimating means.

2. The control apparatus for an internal combustion engine according to claim 1,
    wherein the fuel supply amount correcting means includes estimating means that estimates the unburned fuel amount, based on an integrated engine speed during the fuel cut with the valve stop control.

3. The control apparatus for an internal combustion engine according to claim 1, wherein the control apparatus for the internal combustion engine further comprises filled state determining means that determines whether the inside of the combustion chamber is in a exhaust gas filled state in which exhaust gas is filled in the combustion chamber, or in a fresh air filled state in which fresh air is filled in the combustion chamber on a cylinder-by-cylinder basis, when the operation states of the intake valve and the exhaust valve are changed to the valve closed and stopped states by the valve stop executing means, and wherein the advance fuel supply means supplies a fuel to the combustion chamber before the operation state of the exhaust valve is returned to the valve operation state, for only a cylinder which is determined as being in the fresh air filled state.

4. The control apparatus for an internal combustion engine according to claim 1, further comprising catalyst temperature acquiring means that acquires a temperature of a catalyst which is disposed in an exhaust passage of the internal combustion engine, wherein the advance fuel supply means corrects the fuel supply amount so that an air-fuel ratio at a time of combustion with a fuel in the fuel supply amount becomes rich as compared with a case in which the temperature of the catalyst is a predetermined value or lower, when the temperature of the catalyst at the time of supply of the fuel in the fuel supply amount is higher than the predetermined value.

5. A control apparatus for an internal combustion engine, the control apparatus comprising:

a valve stop mechanism that is capable of changing operation states of an intake valve and an exhaust valve between valve operation states and valve closed and stopped states, respectively; and a controller that is programmed to:

execute fuel cut when a predetermined execution condition is established during operation of the internal combustion engine;

perform valve stop control that changes the operation states of both of the intake valve and the exhaust valve to the valve closed and stopped states, at a time of execution of the fuel cut;

detect a return request from the fuel cut;

supply a fuel to a combustion chamber of the internal combustion engine, before an operation state of the exhaust valve is returned to the valve operation state, if a return request from the fuel cut with the valve stop control is detected;

correct the fuel supply amount by the advance fuel supply means in accordance with an amount of an unburned fuel contained in oil which enters an inside of the combustion chamber from a crank chamber side during the fuel cut with the valve stop control; and change the operation state of the intake valve to the valve operation state prior to return of the exhaust valve to the valve operation state, when a return request from the fuel cut is detected, wherein the controller estimates intake manifold negative pressure at a time of return of the intake valve to the valve operation state in accordance with the intake manifold negative pressure immediately before start of execution of the fuel cut and an executing time of the fuel cut, and wherein the controller corrects the fuel supply amount supplied that the controller supplies, based on the intake manifold negative pressure that the controller the estimates.

* * * * *